(12) United States Patent
Babaee et al.

(10) Patent No.: US 12,375,326 B2
(45) Date of Patent: Jul. 29, 2025

(54) NON-LINEAR PRECODING FOR MAXIMUM LIKELIHOOD SEQUENCE ESTIMATION (MLSE) RECEIVER

(71) Applicant: CIENA CORPORATION, Hanover, MD (US)

(72) Inventors: Ramin Babaee, Ottawa (CA); Shahab Oveis Gharan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 56 days.

(21) Appl. No.: 18/481,687

(22) Filed: Oct. 5, 2023

(65) Prior Publication Data

US 2025/0119324 A1 Apr. 10, 2025

(51) Int. Cl.
 *H03H 7/30* (2006.01)
 *H04L 25/03* (2006.01)

(52) U.S. Cl.
 CPC .............. *H04L 25/03178* (2013.01)

(58) Field of Classification Search
 CPC ................................. H04L 25/03178
 USPC ....................................... 375/229
 See application file for complete search history.

(56) References Cited

U.S. PATENT DOCUMENTS

| | | | | |
|---|---|---|---|---|
| 8,582,223 | B1 * | 11/2013 | Garani | G11B 5/02 375/348 |
| 2005/0052292 | A1 | 3/2005 | Shalvi | |
| 2011/0222854 | A1 | 9/2011 | Roberts et al. | |

FOREIGN PATENT DOCUMENTS

FI 2508165 A * 5/2014

OTHER PUBLICATIONS

"International Search Report & Written Opinion for PCT/US2024/049910", Dec. 23, 2024, 12 Pages.
Fischer, Robert F.H., "Precoding and Signal Shaping for Digital Transmission", The Institute of Electrical and Electronics Engineers, Inc., 2002, 506 Pages.
Fischer, Robert F.H., et al., "Tomlinson-Harashima Precoding in Space-Time Transmission for Low-Rate Backward Channel", 2002 International Zurich Seminar on Broadband Communications Access—Transmission—Networking Feb. 19-21, ETH Zurich, Switzerland, Feb. 2002, 6 Pages.
Forney, Jr., G. David, et al., "Combined Equalization and Coding Using Precoding", IEEE Communications Magazine, Dec. 1991, 10 Pages.
Garcia-Rodriguez, Adrian, et al., "Power-Efficient Tomlinson-Harashima Precoding for the Downlink of Multi-User MISO Systems", IEEE Transactions on Communications, vol. 62, No. 6, Jun. 2014, 13 Pages.

(Continued)

*Primary Examiner* — Helene E Tayong
(74) *Attorney, Agent, or Firm* — Guntin & Gust, PLC; Kenneth S. Kwan

(57) ABSTRACT

Aspects of the subject disclosure may include, for example, obtaining a data signal that includes a stream of symbols, modifying the data signal, resulting in a modified data signal, such that there is inter-symbol interference (ISI) when the modified data signal is received by a receiver, and transmitting the modified data signal over a channel to the receiver, wherein the ISI is distinct from an inverse of the channel and is introduced based on the modifying to be exploited by a decoder in the receiver for enhanced decoding. Other embodiments are disclosed.

24 Claims, 11 Drawing Sheets

(56) References Cited

OTHER PUBLICATIONS

Harashima, Hiroshi, et al., "Matched-Transmission Technique or Channels With Intersymbol Interference", IEEE Transactions on Communications, vol. COM-20, No. 4, Aug. 1972, 7 Pages.

Kabal, Peter, et al., "Partial-Response Signaling", IEEE Transactions on Communications, vol. COM-23, No., 9, Sep. 1975, 14 Pages.

Kasturia, Sanjay, et al., "Vector Coding for Partial Response Channels", IEEE Transactions on Information Theory. vol. 36. No. 4, Jul. 1990.

Kusume, Katsutoshi, et al., "Efficient Tomlinson-Harashima Precoding for Spatial Multiplexing on Flat MIMO Channel", 0-7803-8938-7/05/$20.00 (C) 2005 IEEE, 2005, 5 Pages.

Lee, Seung-Woo, et al., "Demonstration of 200 Gbps PAM-4 transmission in a limited-bandwidth system using a two-tap THP with nonlinearity compensator", https://doi.org/10.1016/j.yofte.2022.103184, Dec. 10, 2022, 8 Pages.

Ma, Wing-Kin, et al., "Quasi-Maximum-Likelihood Multiuser Detection Using Semi-Definite Relaxation With Application to Synchronous CDMA", IEEE Transactions On Signal Processing, vol. 50, No. 4, Apr. 2002, 11 Pages.

Mazo, James E., et al., "On the Transmitted Power in Generalized Partial Response", IEEE Transactions on Communications, vol. COM-24, No. 3, Mar. 1976, 5 Pages.

Peh, Edward C. Y., et al., "Power and Modulo Loss Tradeoff with Expanded Soft Demapper for LDPC Coded GMD-THP MIMO Systems", IEEE Transactions on Wireless Communications, vol. 8, No. 2, Feb. 2009, 11 Pages.

Said, Amir, et al., "Bandwidth-Efficient Coded Modulation with Optimized Linear Partial-Response Signals", IEEE Transactions on Information Theory, vol. 44, No. 2, Mar. 1998, 13 Pages.

Shamai (Shitz), Shlomo, et al., "The Intersymbol Interface Channel: Lower Bounds on Capacity and Channel Precoding Loss", IEEE Transactions on Information Theory, vol. 42, No. 5, Sep. 1996, 17 Pages.

Stankovic, Veljko, et al., "Successive Optimization Tomlinson-Harashima Precoding (SO THP) for Multi-User MIMO Systems", 0-7803-8874-7/05/$20.00 @2005 IEEE, 2005, 4 Pages.

Xing, Zhenping, et al., "Experimental Demonstration of 600 Gb/s Net Rate PAM4 Transmissions Over 2 km and 10 km With a 4-λ CWDM TOSA", Journal of Lightwave Technology, vol. 38, No. 11, Jun. 1, 2020.

Zhu, Paikun, et al., "Optoelectronic Feedforward Equalization: Simple 1-tap Optical Delay Line and Ethernet-compliant Linear FFE Enabling C-band 100G PAM4 over ER+ distance", European Conference on Optical Communication (ECOC) 2022, 2022.

\* cited by examiner

NON-LINEAR PRECODING FOR MAXIMUM LIKELIHOOD SEQUENCE ESTIMATION (MLSE) RECEIVER

FIELD OF THE DISCLOSURE

The subject disclosure relates to non-linear precoding for maximum likelihood sequence estimation (MLSE) or MLSE-like decoders.

BACKGROUND

Inter-symbol interference (ISI) is a phenomenon in communications in which the energy of a symbol interferes with that of other symbols. One option to address ISI is to add an Additive White Gaussian Noise (AWGN) signal at the output of the channel, and design a filter at the receiver that provides inverse filtering of the channel response. This allows for received signals that are generally ISI-free. However, this results in noise that is no longer white, but rather colored. The main drawback of linear equalization at the receiver, therefore, is noise enhancement in severely distorted channels. This causes a significant increase in noise power at the output of the equalizer, particularly when the channel has zeros close to the unit circle. Decision-feedback equalization (DFE) combats this issue by using previously detected symbols to cancel the ISI. The downside is the error propagation when a symbol is detected incorrectly. Another option is to have channel state information available at the transmitter, where a feedback equalizer—i.e., an inverse filtering of the channel response—is designed and implemented on the transmitter side. This similarly allows for received signals that are generally ISI-free. However, the downside is that a significantly higher transmit power is required.

BRIEF DESCRIPTION OF THE DRAWINGS

Reference will now be made to the accompanying drawings, which are not necessarily drawn to scale, and wherein.

DETAILED DESCRIPTION

The Tomlinson-Harashima precoding (THP) algorithm is a precoding scheme that allows for the equalization of a channel response at the transmitter without a significant power penalty. THP applies a non-linear modulo operation (in the feed-forward path of the precoder) in order to bound the amplitude of the transmitted signal. This overcomes the aforementioned required increase in transmit power in cases where inverse filtering of the channel response is implemented in the transmitter. The operation is reversible at the receiver without a performance penalty. Although THP has been initially proposed for ISI cancellation at the transmitter for single-input and single-output (SISO) channels, it has been extended to spatial equalization in multiple-input and multiple-output (MIMO) systems, where inter-user interference cancellation is performed.

Figure 1A:
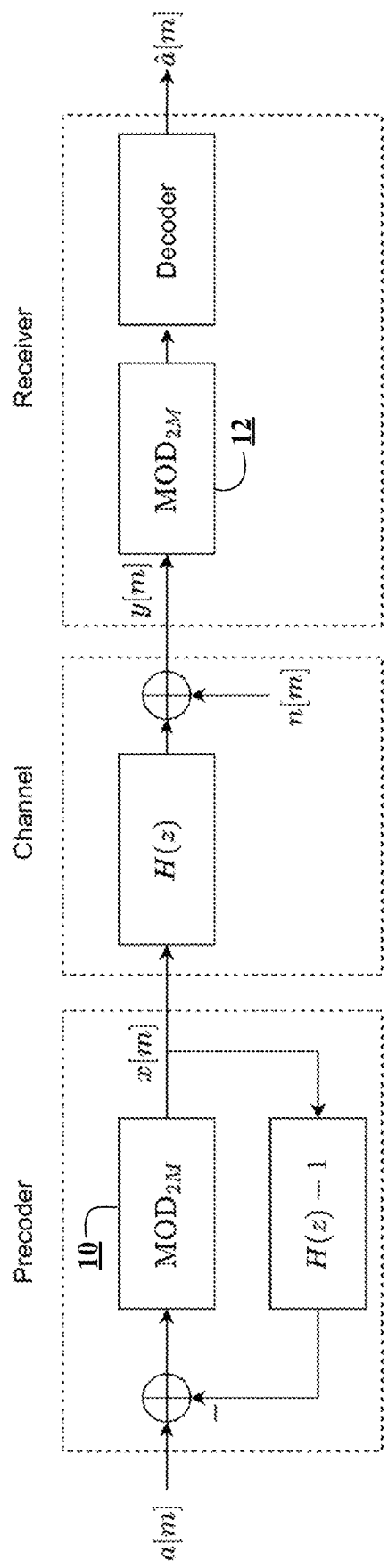
FIG. 1A is a basic system model of a discrete-time zero-forcing Tomlinson-Harashima precoding (THP) precoder.
Figure 1B:
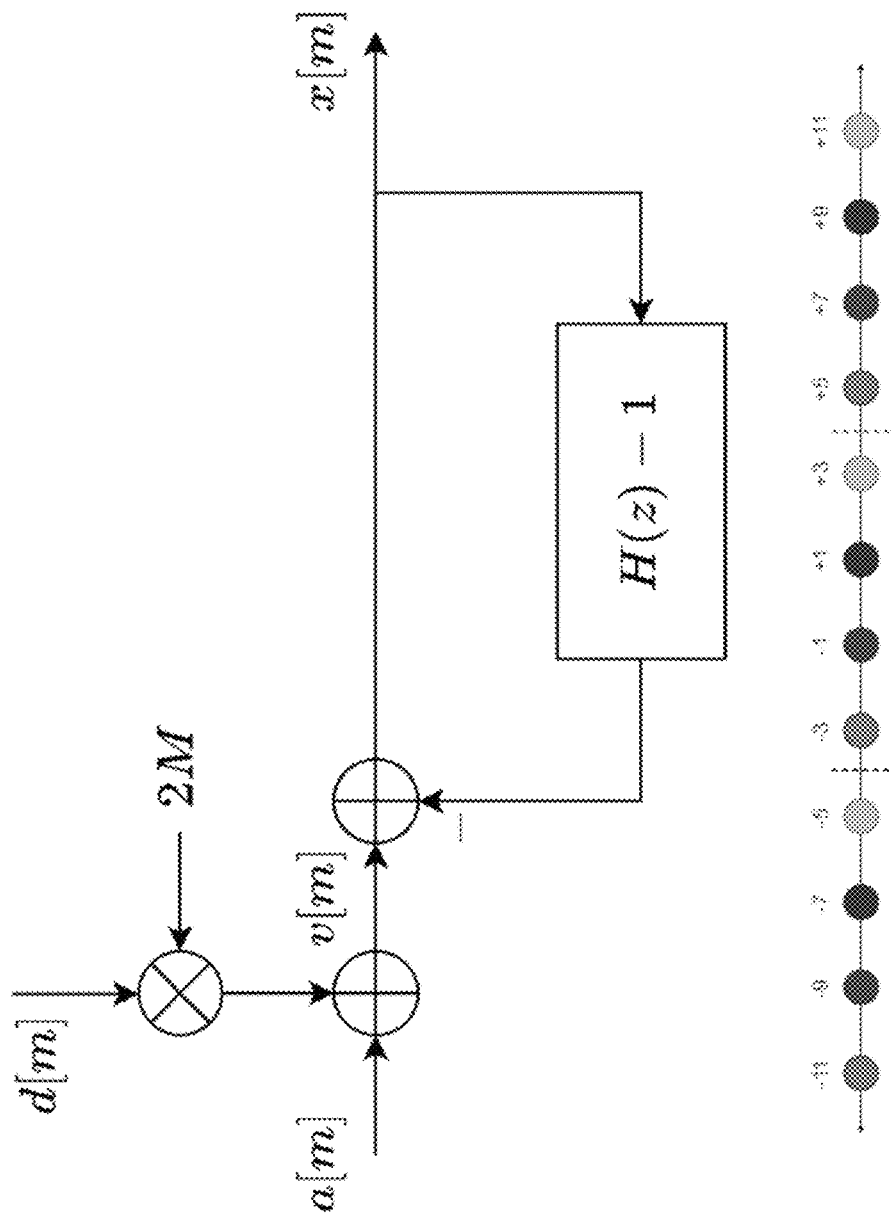
FIG. 1B is an equivalent linearized model of the THP encoder of FIG. 1A.

FIG. 1A is a basic system model of a discrete-time zero-forcing THP precoder. Consider an ISI channel with Z-transfer function $H(z)=\Sigma_m h[m]z^{-m}$, where the channel impulse response h[m] is assumed to be real, causal, minimum-phase, and monic, i.e., h[0]=1. The encoded bits may be mapped to symbols a[m] which are drawn from an M-ary pulse amplitude modulation (PAM) constellation $\mathcal{C} =\{\pm1, \pm3, \pm(M-1)\}$, where M is an even integer. The symbol sequence a[m] may then be fed to the THP precoder. The modulo operator $MOD_{2M}$ (10) maps R onto the half-open interval [−M, M) such that $MOD_{2M}(x)=x+2Md$ where $d \in Z$ is an integer for which $MOD_{2M}(x) \in [-M, M)$. The modulo operation ensures that the output signal is enforced to the half-open interval [−M, M). The THP precoder effectively applies the inverse of the channel transfer function, i.e., 1/H(z), to the transmitted signal which is canceled out by the channel. Therefore, an ISI channel is transformed into a memoryless AWGN channel. The effect of the non-linear modulo operator can be characterized by finding a linearized model of THP. FIG. 1B is an equivalent linearized model of the THP encoder of FIG. 1A. An integer sequence d[m] is added to the data sequence a[m] such that when the effective data sequence v[m]=a[m]+2Md[m] is filtered with 1/H(z), the output signal x[m] is in the range [−M, M).

At the receiver, the same modulo operation (12) is performed to the received signal y[m] in order to retrieve the transmitted sequence. In the absence of channel noise n[m], the received signal is the effective data sequence v[m]. We can write:

$$MOD_{2M}(y[m]) = MOD_{2M}(v[m])$$
$$= MOD_{2M}(a[m] + 2Md[m])$$
$$= a[m].$$

Figure 1C:
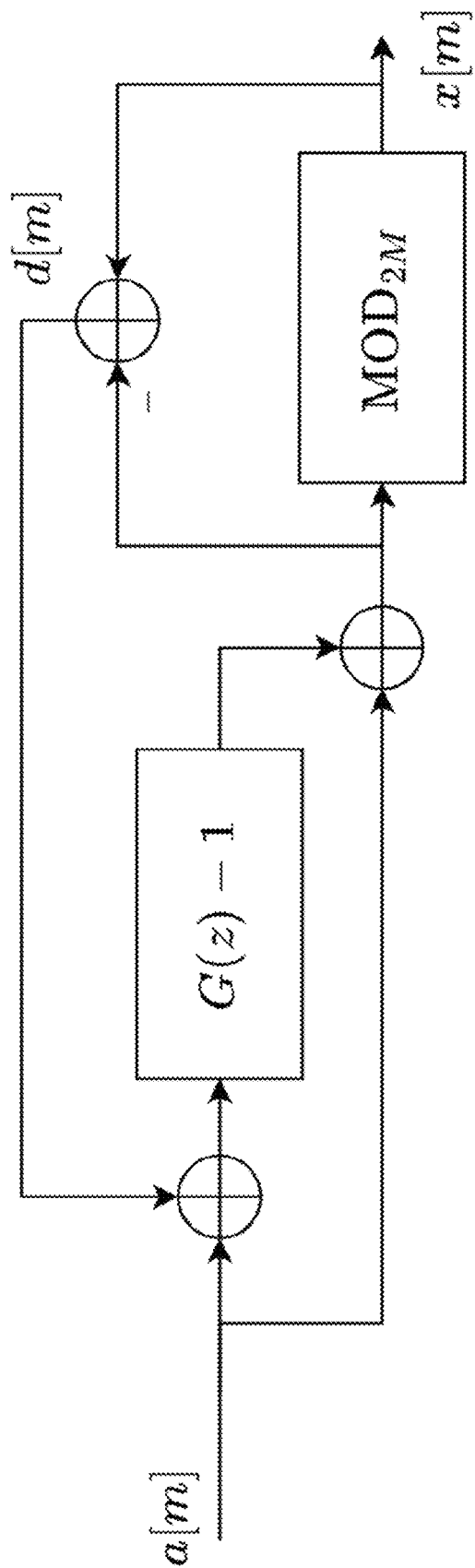
FIG. 1C is a block diagram of a non-recursive THP precoder.

The conventional THP algorithm discussed thus far is suitable for channel models that can be formulated as a finite impulse response (FIR) filter. Sometimes, all-pole modeling of the channel response is a more suitable alternative. A non-recursive structure for THP may be suitable for infinite impulse response (IIR) channel models. FIG. 1C is a block diagram of a non-recursive THP precoder. Let H(z)=1/G(z)

be an all-pole impulse response of a channel, where G(z) is the Z-transform of FIR filter g [m] with L taps. The data sequence a[m] is first filtered with G(z) followed by modulo operation. The precoding sequence 2Md[m] is directly calculated and added back to the input sequence a[m]. While this structure has the advantage of being robust against quantization error for hardware implementation as compared to the conventional THP precoder, the integer sequence d [m] can take on large values. As a result, all the filtering calculations need to be done with a larger number of bits.

When characterizing the efficiency of THP, the performance loss is categorized into several main classes:

Shaping loss: This loss can be attributed to the output signal statistics. After the modulo operation, the channel input is uniformly distributed across the modulo domain. In order to achieve AWGN channel capacity, a Gaussian-distributed signal is required at the channel input. Note that the shaping loss is the dominant performance loss factor at a high signal-to-noise ratio (SNR) region.

Power loss: Due to modulo operation, the signal power increases compared to a non-precoded transmission. Assuming a uniform signal distribution after the modulo operator, a power loss of 1.25 decibel (dB) and 0.28 dB is expected for binary phase shift keying (BPSK) and 4-amplitude shift keying (ASK) modulations, respectively.

Modulo loss: In the presence of noise, the modulo operation at the receiver can result in incorrect decoding of the received symbols for the constellation points that are at the edge of the constellation. This loss is a significant factor at a low SNR region.

An advantage of THP is that coded modulation techniques, such as trellis coded modulation (TCM), can be utilized along with THP to achieve close-to-channel capacity performance. Although THP can also be utilized in conjunction with more recent coding algorithms, such as low-density parity check (LDPC) codes, it generally cannot be used with constellation shaping methods in a straightforward manner. Signal characteristics at the input of the precoder can be completely modified by the non-linear modulo operator, resulting in a non-optimal signal distribution at the channel input.

Symbol-by-symbol detection involves decoding each symbol independently. MLSE, in contrast, minimizes the probability of error by leveraging the dependency of adjacent symbols to find the sequence with the highest likelihood. This results in significant performance improvement over symbol-by-symbol detection in certain channel conditions. Let's assume that the transmitted sequence is x[n], the channel response is h[n], and AWGN is denoted by z[n]. The received signal can then be written as:

$$r[n] = x[n] * h[n] + z[n].$$

The MLSE algorithm finds the optimum sequence x*[n] such that:

$$x^*[n] = \arg\max Pr(x[n]|r[n]),$$

where $Pr(\cdot|\cdot)$ denotes the conditional probability. If the transmitted symbols are uniformly distributed and the noise is AWGN, the detection can be simplified to:

$$x^*[n] = \arg\max Pr(x[n]|r[n])$$
$$= \arg\max Pr(r[n]|x[n])$$
$$= \arg\max \sum_n |r[n] - x[n] * h'[n]|^2,$$

where h'[n] is the estimated channel response.

The subject disclosure describes illustrative embodiments of a non-linear precoding algorithm that injects ISI into a transmit signal (by introducing symbol dependency or correlation between consecutive symbols) that certain decoders at the receiving end can exploit in the decoding process. These decoders may include MLSE decoders or other types of similar decoders, such as reduced state MLSE decoders, decoders that approximate MLSE, brightening decoders, etc. In exemplary embodiments, an adapted form of THP may be used as the precoding algorithm for introducing (or magnifying) the ISI and/or channel droop.

The performance of MLSE (or the like), in particular, is largely determined by the minimum Euclidean distance of received sequences. The greater the minimum Euclidean distance of received sequences, the greater the decoding performance. In one or more embodiments, the THP algorithm may be adapted to design or shape transmit sequences such that the minimum Euclidean distance of received sequences is maximized. In this way, the increased ISI that results when the transmitted signal is received by the receiver can be leveraged by the MLSE decoder for improved decoding performance. As an alternative to designing or shaping transmit sequences such that the minimum Euclidean distance of received sequences is maximized, the total transmit power may instead be reduced subject to a minimum Euclidean distance that is greater than or equal to a constant (e.g., a threshold). The value of the threshold may be chosen as desired (i.e., may not be important), as it would generally linearly scale the transmit power. In some embodiments, the value of the threshold may be chosen such that the total transmit power is not reduced to a level that is below an accepted minimum transmit power level.

In stark contrast to conventional THP-based systems, where THP (e.g., completely) cancels out channel ISI by applying the inverse of the channel transfer function to the transmit signal such that the received signal at the receiver is ISI-free, exemplary embodiments described herein instead applies non-linear precoding to magnify/modify ISI of the channel. This advantageously allows decoders, such as an MLSE decoder, to exploit the additional ISI for improved decoding. In fact, this exploitation is possible even in ideal channel conditions (which is not otherwise possible with conventional THP precoding due to its pre-cancellation of ISI).

As will be apparent from the description below, exemplary embodiments of the non-linear precoding filter design yield high SNR. A significant gain is possible from a proper combination of THP precoding and MLSE at the receiver. When the exemplary THP algorithm is utilized, the power increase is negligible (e.g., 0.28 dB for 4-ASK), which provides improved performance in the usual case where the Tx has a power constraint.

One or more aspects of the subject disclosure include a device. The device may include a processing system including a processor, and a memory that stores executable instructions that, when executed by the processing system, facilitate performance of operations. The operations may include obtaining a data signal that includes a stream of symbols, modifying the data signal, resulting in a modified data signal, such that there is inter-symbol interference (ISI) when the modified data signal is received by a receiver, and transmitting the modified data signal over a channel to the receiver, wherein the ISI is distinct from an inverse of the channel and is introduced based on the modifying to be exploited by a decoder in the receiver for enhanced decoding.

One or more aspects of the subject disclosure include a non-transitory machine-readable medium, comprising executable instructions that, when executed by a processing system including a processor, facilitate performance of operations. The operations may include obtaining a data signal that includes a stream of symbols, modifying the data signal, resulting in a modified data signal, such that there is inter-symbol interference (ISI) when the modified data signal is received by a receiver, and transmitting the modified data signal over a channel to the receiver, wherein the ISI is distinct from an inverse of the channel and is introduced based on the modifying to be exploited by a decoder in the receiver for enhanced decoding.

One or more aspects of the subject disclosure include a method. The method may include obtaining, by a processing system including a processor, a data signal that includes a stream of symbols, modifying, by the processing system, the data signal, resulting in a modified data signal, such that there is inter-symbol interference (ISI) when the modified data signal is received by a receiver, and transmitting, by the processing system, the modified data signal over a channel to the receiver, wherein the ISI is distinct from an inverse of the channel and is introduced based on the modifying to be exploited by a decoder in the receiver for enhanced decoding.

Figure 1D:
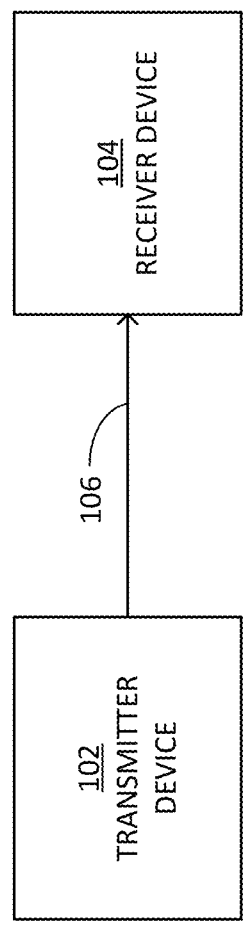
FIG. 1D is a diagram of a non-limiting example of a communication network in accordance with various aspects described herein.

FIG. 1D is a diagram of a non-limiting example of a communication network 100 in accordance with various aspects described herein. The communication network 100 may include at least one transmitter device 102 and at least one receiver device 104. The transmitter device 102 may be capable of transmitting signals over a communication channel, such as a communication channel 106. In one or more embodiments, the transceiver 102 may be a modem. The receiver device 104 may be capable of receiving signals over a communication channel, such as the communication channel 106. In various embodiments, the transmitter device 102 may also be capable of receiving signals and/or the receiver device 104 may also be capable of transmitting signals. Thus, one or both of the transmitter device 102 and the receiver device 104 may be capable of acting as a transceiver.

The communication network 100 may include additional elements not shown in FIG. 1D. For example, the communication network 100 may include one or more additional transmitter devices, one or more additional receiver devices, and one or more other devices or elements involved in the communication of signals in the communication network 100.

In some embodiments, the signals that are transmitted and received in the communication network 100 may include optical signals and/or electrical signals. For example, the transmitter device 102 may be a first optical transceiver, the receiver device 104 may be a second optical transceiver, and the communication channel 106 may be an optical communication channel. In certain embodiments, one or both of the first optical transceiver and the second optical transceiver may be a coherent modem.

In various embodiments, each optical communication channel in the communication network 100 may include one or more links, where each link may include one or more spans, and where each span may include a length of optical fiber and one or more optical amplifiers. Where the communication network 100 involves the transmission of optical signals, the communication network 100 may include additional optical elements not shown in FIG. 1D, such as wavelength selective switches, optical multiplexers, optical de-multiplexers, optical filters, and/or the like.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects, where some of these impairments may result in ISI. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 2A:
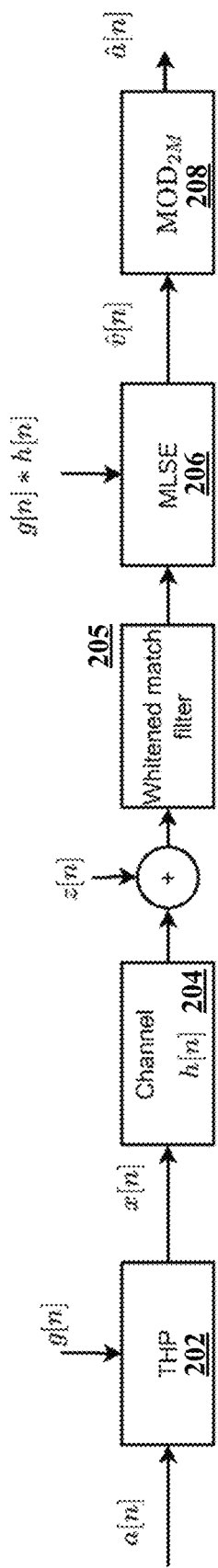
FIG. 2A is a block diagram of an example, non-limiting implementation of non-linear precoding for an MLSE receiver, in accordance with various aspects described herein.

FIG. 2A is a block diagram of an example, non-limiting implementation 200 of non-linear precoding for an MLSE receiver, in accordance with various aspects described herein. In one or more embodiments, the precoding may be implemented in a transmitter, and a precoded signal may be transmitted over a channel to the receiver. In various embodiments, the transmitter may be the same as or correspond to the transmitter 102 of FIG. 1D, the channel may be the same as or correspond to the link 106 of FIG. 1D, and/or the receiver may be the same as or correspond to the receiver 104 of FIG. 1D. In exemplary embodiments, the THP algorithm may be configured to shape transmit sequences x[n] such that the minimum distance of received sequences is maximized. Let's assume that the precoding filter applied by the THP algorithm is denoted by g [n]. Therefore, the transmitted signal for an M-ASK modulation can be formulated as:

$$x[n] = (a[n] + 2M\, d[n]) * g[n] = v[n] * g[n],$$

where d[n] is an integer sequence, and a[n] is drawn from an M-ASK modulation scheme. An objective is to (at least approximately) optimize g [n] such that:

$$\max_{g[n]} \min_{i,j,i\neq j} ed2(h[n]*x_i[n], h[n]*x_j[n]) = \max_{g[n]} \min_{i,j,i\neq j} \sum_n |(v_i[n]-v_j[n])*g[n]*h[n]|^2.$$

The signal power at the output of the THP algorithm can be approximated to be proportional to the square of the largest tap of filter g [n]. Therefore, the power constraint can be written as:

$$\max |g[n]|^2 \le 1.$$

This optimization problem is not convex. However, with some approximations, we can convert it to a convex problem and solve it efficiently. To this end, let's assume that the length of precoding filter g [n] and $(v_i[n]-v_j[n])*h[n]$ is L and N, respectively. We can define the convolution matrix $X_{ij}$ of size N×L as the result of $(v_i[n]-v_j[n])*h[n]$ in matrix form. Therefore, $\|X_{ij} g\|^2$ gives the result of $\Sigma_n|(v_i[n]-v_j[n])*g[n]*h[n]|^2$. Now, $\|X_{ij} g\|^2$ can be expanded as:

$$\|X_{ij}g\|^2 = \text{trace}\{X_{ij}gg^H X_{ij}^H\},$$

where $(\cdot)^H$ is the Hermitian operator. Then, we can define matrix $G=gg^H$, where G is semi-definite and rank-1. Therefore, we have:

$$\|X_{ij}g\|^2 = \text{trace}\{X_{ij}^H X_{ij} G\}.$$

Now, the optimization problem can be written as:

$$\max_G \min_{i,j,i\neq j} \text{trace}\{X_{ij}^H X_{ij} G\}$$

subject to max diag(G) ≤ 1

$$G \succeq 0$$

rank(G) = 1, where G≥0 means G is a positive semidefinite matrix. Note that the objective function and the first two constraints are convex. However, the rank-1 constraint is not convex. We can use a semidefinite relaxation method (e.g., such as that described in W.-K. Ma, T. N. Davidson, K. M. Wong, Z.-Q. Luo, and P.-C. Ching, "Quasi-ML multiuser detection using semi-definite relaxation with application to synchronous CDMA," IEEE Trans. Signal Process., vol. 50, no. 4, pp. 912-922, April 2002, which is incorporated by reference herein in its entirety) and discard the rank-1 constraint, leading to the following optimization problem:

$$\max_G \min_{i,j,i\neq j} \text{trace}\{X_{ij}^H X_{ij} G\}$$

subject to max diag(G) ≤ 1

$$G \succeq 0.$$

The resulting problem can be efficiently solved using numerical convex optimization solvers, such as CVX. Once the optimum matrix G is computed, we can calculate the eigen values of G. If matrix G is already rank-1, then we have the optimum result. If not, filter g[n] can be calculated using the eigen value with the largest amplitude.

It is to be understood and appreciated that alternative techniques can be used to identify or design the filter g[n]. For instance, rather than approaching the problem using optimization, one or more heuristic methods may alternatively be used to design the filter g[n]. As an example, assume that the filter g[n] has several taps and that we start the heuristic process with some random data. Here, the Euclidean distances of received sequences can be measured and monitored, and the transmit data can be progressively modified such that there is an increase in the minimum Euclidean distances of received sequences to thereby arrive at g[n].

It is also to be understood and appreciated that the use of g[n] in the THP constitutes an introduction or injection of ISI that is distinct from channel-related ISI. That is, g[n] is not the inverse of the channel transfer function. To illustrate, assume, for example, that g[n] is a two-tap filter with indexes '1' and '0.9'. As discussed above, the input a[n] sequence (drawn from the aforementioned M-ASK modulation scheme) is convolved with g[n] at the transmitter (THP 202). Application of this filter in the THP 202 provides particular delays to frequency components, and thus effectively adds ISI to the signal. Specifically, frequency components may overlap with each other at the receiving end such that adjacent symbols thereof interfere with (or have dependency on) each other, hence exhibiting injected ISI. Of course, channel-related ISI also results due to the signal's traversal through the channel 204, and so the aggregate response is basically the further convolution of x[n] and the channel response h[n] as described above (see also FIG. 2A). As shown in FIG. 2A, a whitened matched filter 205 may process mixed sequences (z[n] and h[n]) and output filtered sequences to the MLSE 206. In exemplary embodiments, the MLSE 206 may determine all of the possible a[n] sequences (based on the aforementioned M-ASK modulation scheme), and convolve them with known g[n] and an estimated channel response h'[n] to derive all of the possible sequences to be compared with received sequences. The MLSE 206 can then exploit the increased minimum Euclidean distances of received sequences for enhanced decoding, after which a modulo operation 208 can be performed.

For illustration purposes, the following are examples of why an increased minimum distance of received sequences improves MLSE-based decoder performance.

Example

Case I:
    Two possible symbols to transmit: 0, 1
    Transmit sequence: 0, 1, 1, 0
    Noise: 0.6, 0.1, 0.1, 0.1
    Received signal (sum of transmitted and noise): 0.6, 1.1, 1.1, 0.1
    Decoded sequence: 1, 1, 1, 0, which is incorrect
    Euclidean distance (ed2): 1

Case II:
Two possible symbols to transmit: 0, 1
Apply filter: g [n]=[1 1]
Transmit sequence: [0 0][1 1]
Noise: [0.6 0.1][0.1 0.1]
Received signal (sum of transmitted and noise): [0.6 0.1][1.1 1.1]
Decoded sequence: [0 0][1 1](since the Euclidean distance from [0.6 0.1] to [0 0] is smaller than [1 1])
Euclidean distance (ed2): 2 (larger than for Case I)

Figure 2B:
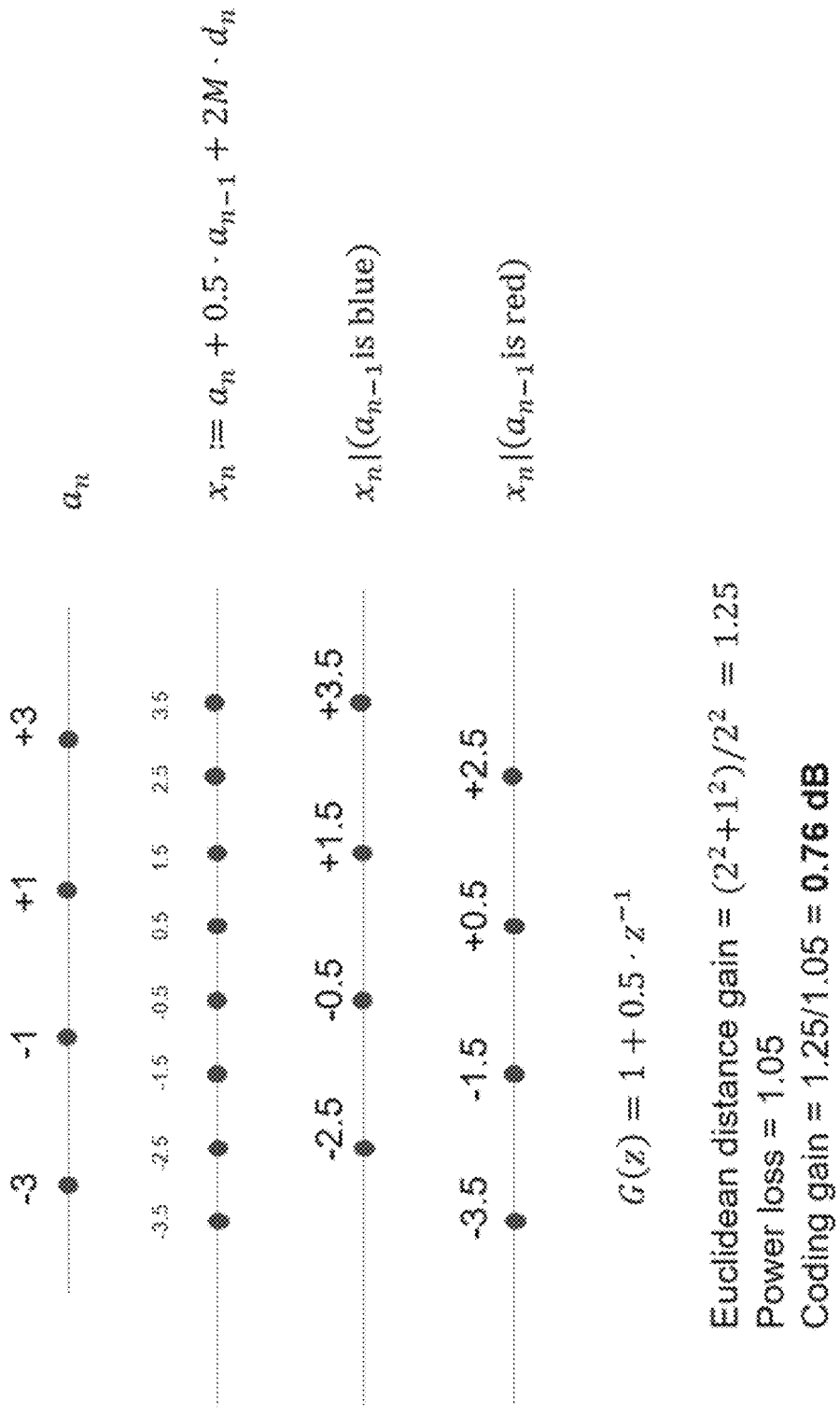
FIG. 2B illustrates a detailed example of how increased minimum distance of received sequences improves MLSE-based decoder performance, in accordance with various aspects described herein.
Figure 2C:
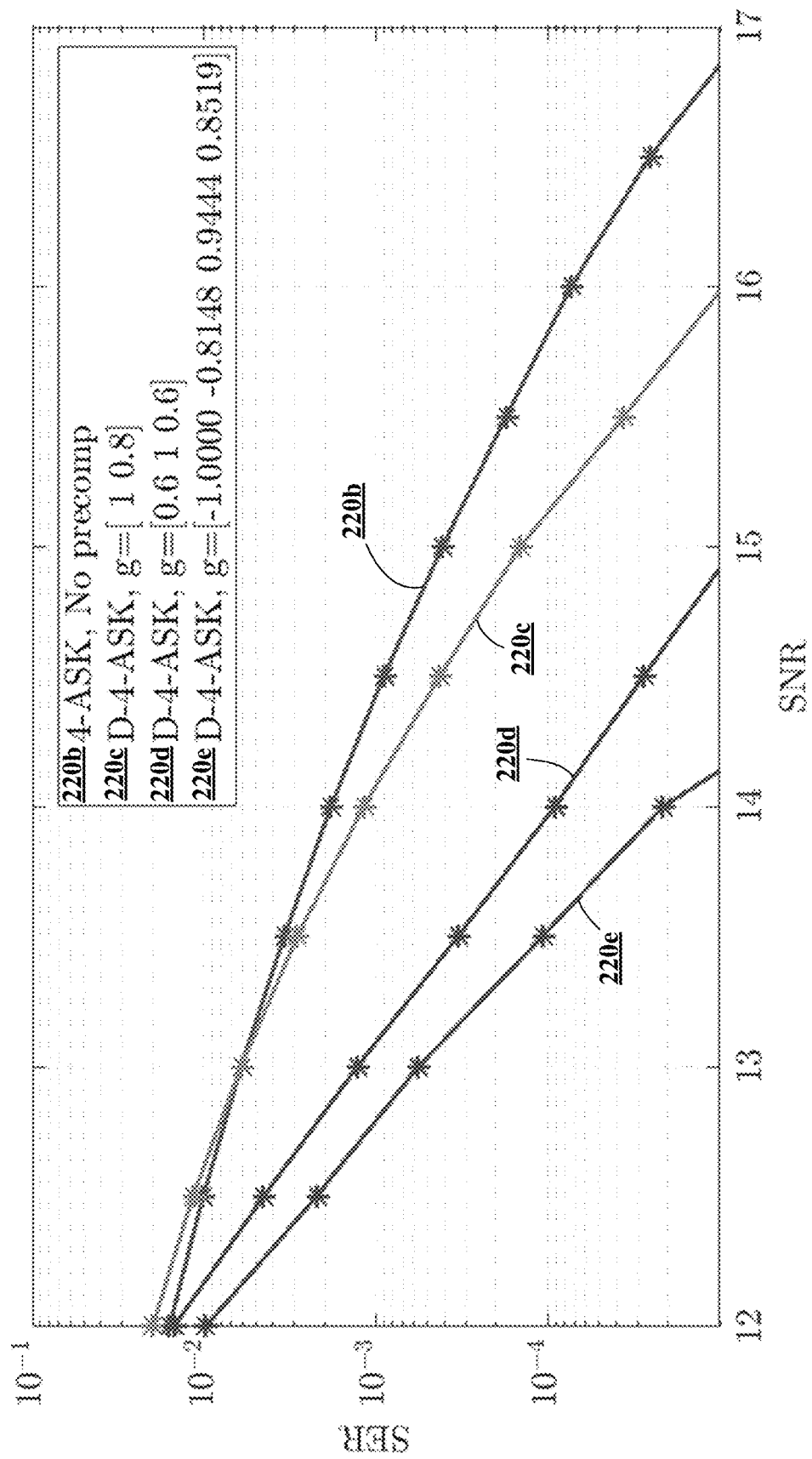
FIG. 2C shows simulation results for various example scenarios, in accordance with various aspects described herein.

Employing the filter g [n] as described above thus makes the system more tolerant to noise. FIG. 2B illustrates another detailed example of how increased minimum distance of received sequences improves MLSE-based decoder performance, in accordance with various aspects described herein. FIG. 2C shows simulation results for various example scenarios, in accordance with various aspects described herein. Simulation parameters were as follows: MLSE detection; Modulation: 4-ASK and differential 4-ASK; and Channel H(z)=(1+0.5z$^{-1}$). In FIG. 2C, the x-axis represents the transmit signal power to channel noise power (i.e., SNR), and the y-axis represents the symbol error rate (SER) of the system. In all cases, an MLSE detector was used at the receiver. Curve 220b represents the baseline case where no precoding was performed at the transmitter. With the exemplary precoding scheme, it can be observed that there is a burst of errors with the MLSE detector. Therefore, we used differential 4-ASK modulation, which, as curves 220c, 220d, and 220e illustrate, result in a significant improvement over the baseline case. Several values of filter length L were considered (where, beyond L=4, there did not appear to be a meaningful performance improvement). In any event, it should be apparent to one skilled in the art that the exemplary precoding scheme can provide a significant performance improvement.

Figure 2D:
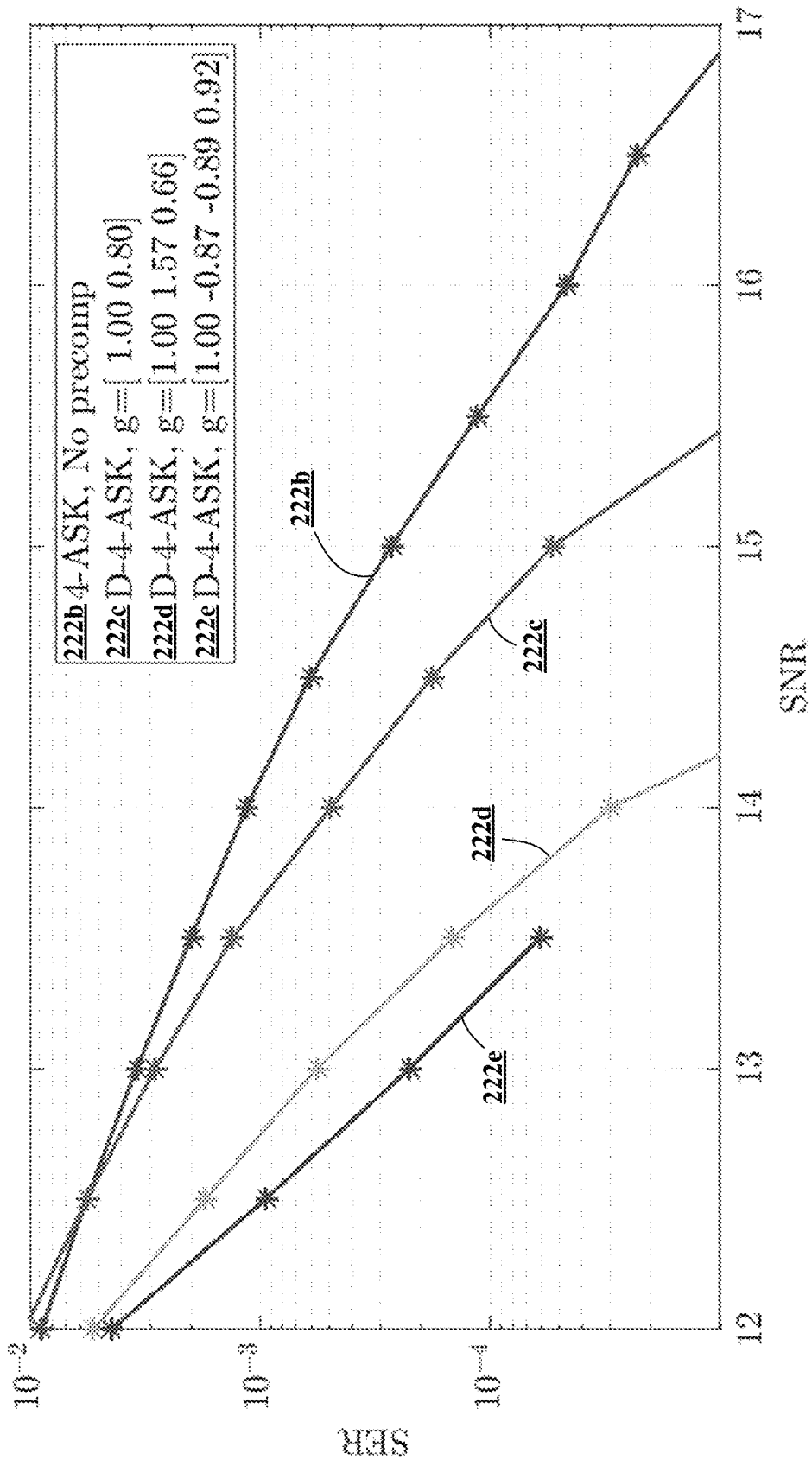
FIG. 2D shows additional simulation results for various example scenarios, in accordance with various aspects described herein.

FIG. 2D shows additional simulation results for various example scenarios, in accordance with various aspects described herein. Simulation parameters were as follows: MLSE detection; Modulation: 4-ASK and differential 4-ASK; and Channel H(z)=1. In all cases, an MLSE detector was used at the receiver. Curve 222b represents the baseline case where no precoding was performed at the transmitter. Using differential 4-ASK modulation, curves 222c, 222d, and 222e illustrate significant improvement over the baseline case. Here, the exemplary precoding scheme can act as a channel coding algorithm. Channel coding is a general scheme for adding redundancy to transmit bits in order to detect and correct for errors introduced by an imperfect channel. Similar to channel coding, the exemplary precoding scheme can provide a performance gain even when no ISI is present in the channel.

Some existing systems utilize linear precoding schemes (also known as partial response signaling) and employ MLSE (i.e., Viterbi decoding) at the receiver to mitigate the impact of ISI in received signals. Other existing systems employ THP at the transmitter for non-linear precoding, where ISI is pre-cancelled, and symbol-by-symbol detection at the receiver for decoding. In any case, conventional THP generally extends the constellation of the chosen modulation scheme. More particularly, referring back to FIG. 1B, the constellation points for 4-ASK may be −3, −1, +1, and +3. Here, conventional THP may extend the constellation to 12-ASK—i.e., to include constellation points −11, −9, −7, −5, −3, −1, +1, +3, +5, +7, +9, and +11. The THP algorithm may, for instance, select one of −5, +3, and +11, such that when the THP output is convolved with the inverse of the channel (i.e., the feedback loop shown in FIG. 1B), the final output is between −M (i.e., −4) and +M (i.e., +4). The THP algorithm thus adds redundancy and uses it to constrain the output, where the receiver may then "receive" the 12-ASK constellation. More importantly, there is dependency between consecutive symbols (albeit weak dependency) since the typical THP encoder only chooses sequences that satisfy the aforementioned amplitude constraints.

There have been proposals to employ MLSE after post-filters, such as the modulo function (for ensuring that the symbols lie inside of the Voronoi region of the baseline constellation), in the receiver of such a THP-based system. However, the modulo function in the receiver removes the aforementioned THP-based dependency between consecutive symbols, leaving nothing for the subsequent MLSE decoder to exploit. Furthermore, the THP implementation also effectively cancels ISI even before signal transmission (i.e., from a channel ISI perspective, there is no dependency between transmitted symbols such that each symbol is completely independent from its adjacent symbols), and thus there is generally no residual channel-related ISI when signals reach the receiver for the MLSE to exploit either. In essence, the addition of MLSE after post-filtering in the receiver does not provide any performance improvements.

Figure 2E:
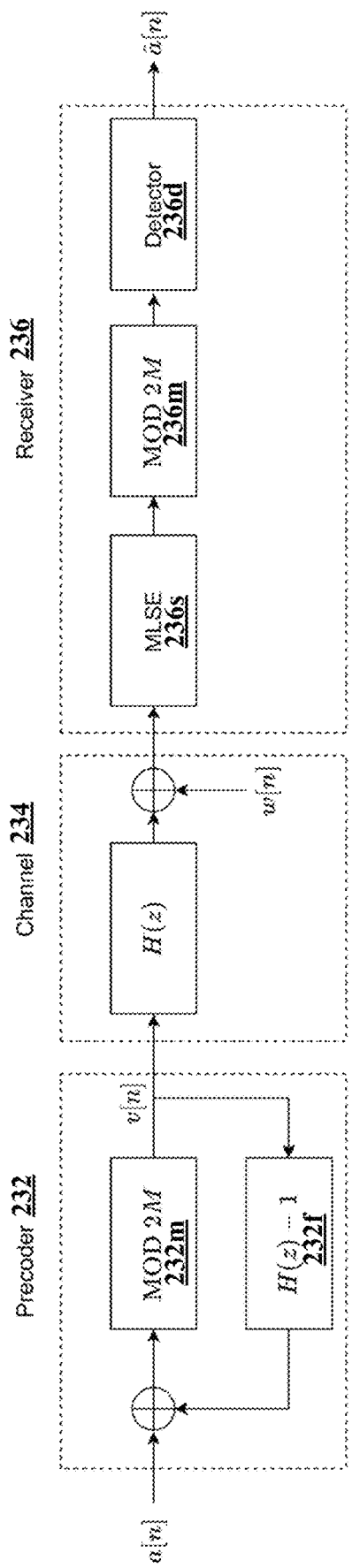
FIG. 2E is a block diagram of an example, non-limiting implementation of an MLSE decoder for THP, in accordance with various aspects described herein.

In exemplary embodiments, the aforementioned THP-based dependency between consecutive symbols is exploited by configuring the receiver with a MLSE decoder prior to the reverse modulo operator. FIG. 2E is a block diagram of an example, non-limiting implementation 230 of an MLSE decoder for THP, in accordance with various aspects described herein. As shown in FIG. 2E, a receiver 236 may include an MLSE-based decoder 236s that provides improved performance when used with a (e.g., typical) THP precoder system 232. The THP precoder may include a modulo operator 232m and a feedback (inverse of channel) function 232f. The transmitted signal v[n] traverses a channel 234 and is mixed with noise signal w[n]. Although the received signal is essentially ISI free (by virtue of the precoding of the inverse of the channel at the transmitter), the MLSE decoder 236s can nevertheless leverage the dependency between consecutive symbols (that results from the THP's restriction to usage of only certain valid sequencies) to discard invalid combinations of symbols so that the MLSE decoder 236s only decodes to those sequences that are valid. Subsequently, a modulo operator 236m may "fold" the symbols into the constrained region (e.g., −4, +4) for final detection by a detector 236d.

For further illustration, let's assume the original and extended constellations are denoted by C and E, respectively, where E=C+2MD. Since a precoding filter g[m] has a memory of L−1 samples, we only need to look at sequences of L symbols. The total number of such sequences drawn from the extended constellation E is |E|$^L$. However, not all sequences are transmitted. The set of all valid sequences P can be found by checking that the convolution with filter g[m] satisfies the amplitude constraint, namely, $$P = \{s \in E^L | -M \leq s^T g < M\},$$

where s=[s[0], s[1], . . . , s[L−1]]$^T$ and g=[g[L−1], . . . , g[1], g[0]]$^T$. A Viterbi decoder can be utilized at the receiver to only search through the valid sequences. This can be achieved by assigning a high cost to the invalid edges of the Trellis.

For a two-dimensional quadrature-amplitude modulation (QAM) constellation, the MLSE may be performed independently for each dimension. Therefore, the relative complexity remains the same when compared to a one-dimensional modulation of the same size.

Figure 2F:
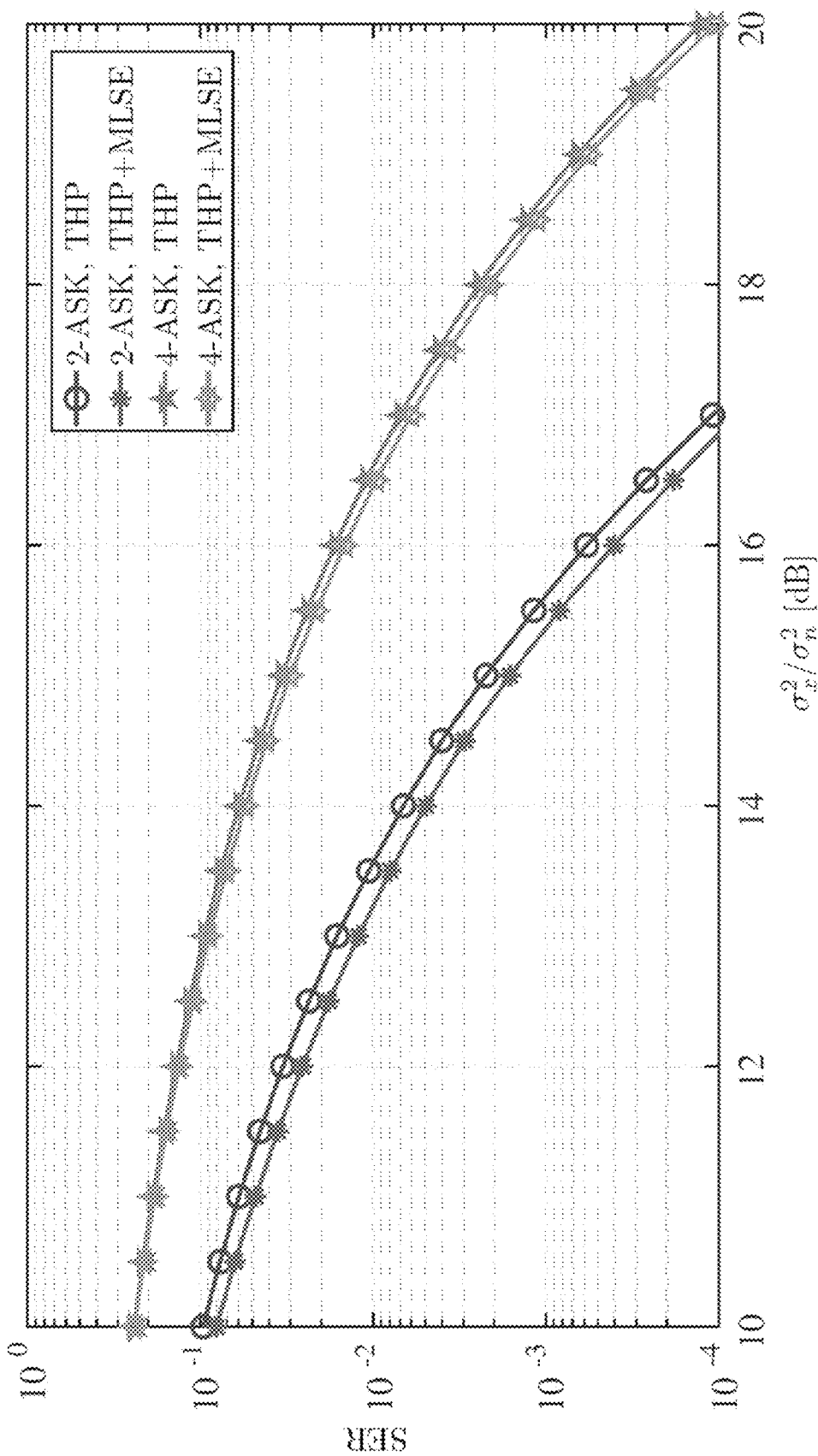
FIG. 2F shows simulation results for various example scenarios, in accordance with various aspects described herein.

To evaluate the performance improvement of the THP precoder and MLSE decoder implementation of FIG. 2E as compared to a conventional THP+MLSE implementation, numerical results were obtained by running Monte Carlo simulations. FIG. 2F shows simulation results for various example scenarios, in accordance with various aspects described herein. We consider 4-ASK and 2-ASK modulations, where 2 and 1 bits per symbol are transmitted, respectively. The SER is plotted as a function of $\sigma_x^2/\sigma_n^2$, where $\sigma_x^2$ and $\sigma_n^2$ represent the transmit signal and channel noise variances, respectively. The simulated channel response is $H(z)=1/(1+0.5z^{-1}+0.75z^{-2})$. As shown, the Rx Viterbi decoder attains around 0.1 dB and 0.2 dB improvement for THP for 4-ASK and 2-ASK, respectively.

It is to be understood and appreciated that, although one or more of FIGS. 2A and 2E might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, modules, etc. have been illustrated in FIGS. 2A and 2E as separate components, devices, systems, modules, etc., it will be appreciated that multiple components, devices, systems, modules, etc. can be implemented as a single component, device, system, module, etc., or a single component, device, system, module, etc. can be implemented as multiple components, devices, systems, modules, etc. Additionally, functions described as being performed by one component, device, system, module, etc. may be performed by multiple components, devices, systems, modules, etc., or functions described as being performed by multiple components, devices, systems, modules, etc. may be performed by a single component, device, system, module, etc.

Figure 3:
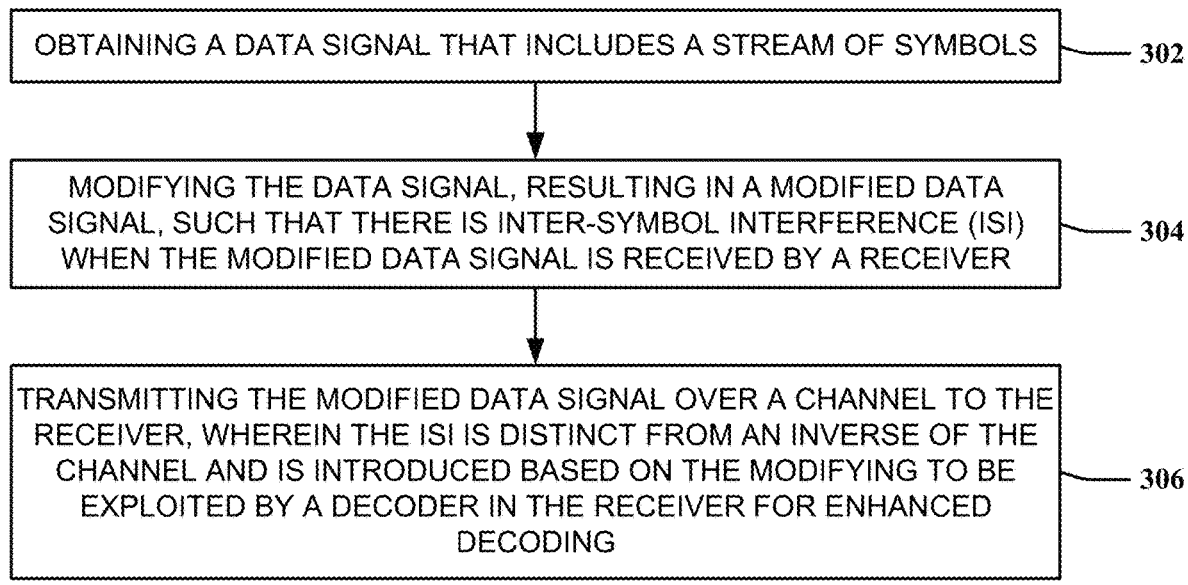
FIG. 3 depicts an illustrative embodiment of a method in accordance with various aspects described herein.

FIG. 3 depicts an illustrative embodiment of a method 300 in accordance with various aspects described herein.

At 302, the method can include obtaining a data signal that includes a stream of symbols. For example, a transmitter equipped with the THP precoder of FIG. 2A can, similar to that described elsewhere herein, perform one or more operations that include obtaining a data signal that includes a stream of symbols.

At 304, the method can include modifying the data signal, resulting in a modified data signal, such that there is intersymbol interference (ISI) when the modified data signal is received by a receiver. For example, the transmitter can, similar to that described elsewhere herein, perform one or more operations that include modifying the data signal, resulting in a modified data signal, such that there is intersymbol interference (ISI) when the modified data signal is received by a receiver.

At 306, the method can include transmitting the modified data signal over a channel to the receiver, wherein the ISI is distinct from an inverse of the channel and is introduced based on the modifying to be exploited by a decoder in the receiver for enhanced decoding. For example, the transmitter can, similar to that described elsewhere herein, perform one or more operations that include transmitting the modified data signal over a channel to the receiver, wherein the ISI is distinct from an inverse of the channel and is introduced based on the modifying to be exploited by a decoder in the receiver for enhanced decoding.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising
   obtaining a data signal that includes a stream of symbols,
   modifying the data signal, resulting in a modified data signal, such that there is inter-symbol interference (ISI) added with a prescribed non-zero discrete sequence when the modified data signal is received by a receiver, and
   transmitting the modified data signal over a channel to the receiver, wherein the ISI is distinct from an inverse of the channel and is introduced based on the modifying to be exploited by a decoder in the receiver for enhanced decoding.

2. The device of claim 1, wherein the decoder comprises a Maximum Likelihood Sequence Estimation (MLSE) decoder.

3. The device of claim 1, wherein the decoder comprises a decoder that approximates Maximum Likelihood Sequence Estimation (MLSE), that performs reduced state MLSE, or a combination thereof.

4. The device of claim 1, wherein the modifying the data signal is performed using a Tomlinson-Harashima Precoding (THP) algorithm.

5. The device of claim 1, wherein the modifying the data signal involves shaping of symbol sequences in which a minimum Euclidean distance of received sequences is maximized.

6. The device of claim 1, wherein the modifying the data signal results in symbol dependency that is exploitable by the decoder to provide the enhanced decoding.

7. The device of claim 1, wherein the modifying the data signal involves an optimization process.

8. The device of claim 1, wherein the modifying the data signal involves a heuristic method.

9. The device of claim 1, wherein the modifying the data signal comprises a non-linear precoding process.

10. The device of claim 1, wherein the prescribed non-zero discrete sequence is chosen from integer multiples of a fixed real value L.

11. The device of claim 10, wherein the fixed real value L matches with a transmitted pulse amplitude modulation (PAM) interval length of 2M, wherein M is an even integer.

12. The device of claim 1, wherein the prescribed non-zero discrete sequence is chosen to reduce or minimize transmitted sequence average power.

13. The device of claim 1, wherein the modifying of the data signal includes providing a filter according to one of
   computing an optimum matrix and eigen values of the optimum matrix, wherein an eigen value of a largest amplitude is utilized responsive to the optimum matrix not being a rank-1 matrix, or
   progressively modifying transmit data according to measured distances between received sequences at the receiver such that there is an increase in the minimum distances of the received sequences.

14. A non-transitory machine-readable medium, comprising executable instructions that, when executed by a processing system including a processor, facilitate performance of operations, the operations comprising:
   obtaining a data signal that includes a stream of symbols;
   modifying the data signal, resulting in a modified data signal, such that there is inter-symbol interference (ISI) added with a prescribed non-zero discrete sequence when the modified data signal is received by a receiver; and
   transmitting the modified data signal over a channel to the receiver, wherein the ISI is distinct from an inverse of the channel and is introduced based on the modifying to be exploited by a decoder in the receiver for enhanced decoding.

15. The non-transitory machine-readable medium of claim 14, wherein the decoder comprises a Maximum Likelihood Sequence Estimation (MLSE) decoder.

16. The non-transitory machine-readable medium of claim 14, wherein the decoder comprises a decoder that approximates Maximum Likelihood Sequence Estimation (MLSE), that performs reduced state MLSE, or a combination thereof.

17. The non-transitory machine-readable medium of claim 14, wherein the modifying the data signal is performed using a Tomlinson-Harashima Precoding (THP) algorithm.

18. The non-transitory machine-readable medium of claim 14, wherein the modifying the data signal involves shaping of symbol sequences in which a minimum Euclidean distance of received sequences is either maximized or is greater than or equal to a threshold.

19. The non-transitory machine-readable medium of claim 14, wherein the modifying the data signal results in symbol dependency that is exploitable by the decoder to provide the enhanced decoding.

20. A method, comprising:
   obtaining, by a processing system including a processor, a data signal that includes a stream of symbols;
   modifying, by the processing system, the data signal, resulting in a modified data signal, such that there is inter-symbol interference (ISI) added with a prescribed non-zero discrete sequence when the modified data signal is received by a receiver; and
   transmitting, by the processing system, the modified data signal over a channel to the receiver, wherein the ISI is distinct from an inverse of the channel and is introduced based on the modifying to be exploited by a decoder in the receiver for enhanced decoding.

21. The method of claim 20, wherein the decoder comprises a Maximum Likelihood Sequence Estimation (MLSE) decoder.

22. The method of claim 20, wherein the decoder comprises a decoder that approximates Maximum Likelihood Sequence Estimation (MLSE), that performs reduced state MLSE, or a combination thereof.

23. The method of claim 20, wherein the modifying the data signal is performed using a Tomlinson-Harashima Precoding (THP) algorithm.

24. The method of claim 20, wherein the modifying the data signal involves shaping of symbol sequences in which a minimum Euclidean distance of received sequences is either maximized or is greater than or equal to a threshold.

* * * * *